United States Patent [19]

Beales

[11] 4,214,840

[45] Jul. 29, 1980

[54] QUICK-RELEASE COUPLER

[75] Inventor: John H. Beales, Langley, Canada

[73] Assignee: J. H. Beales Steel Fabricators, Ltd., Langley, Canada

[21] Appl. No.: 4,373

[22] Filed: Jan. 18, 1979

[51] Int. Cl.³ .................... F16D 3/30; F16L 17/00
[52] U.S. Cl. ................................. 403/31; 403/322; 403/317; 172/272; 37/118 R; 414/723
[58] Field of Search .............. 403/322, 316, 317, 31; 172/272, 273, 274, 275; 214/723; 37/118 R

[56] References Cited

U.S. PATENT DOCUMENTS

| | | | |
|---|---|---|---|
| 2,963,183 | 12/1960 | Przybylski | 414/723 |
| 3,887,096 | 6/1975 | Wieland | 214/145 |
| 3,985,249 | 10/1976 | Aker | 214/145 A |
| 4,030,624 | 6/1977 | Matthews | 214/145 A |
| 4,068,959 | 1/1978 | Pemberton | 403/15 |
| 4,071,154 | 1/1978 | Retzlaff | 214/145 A |
| 4,116,347 | 9/1978 | Uchida | 214/145 A |
| 4,133,121 | 1/1979 | Hemphill | 37/118 R |

FOREIGN PATENT DOCUMENTS

| | | | |
|---|---|---|---|
| 46-7647 | 7/1971 | Japan | 403/322 |
| 216635 | 3/1967 | Sweden | 214/145 A |

*Primary Examiner*—Wayne L. Shedd
*Attorney, Agent, or Firm*—Klarquist, Sparkman, Campbell, Leigh, Hall & Whinston

[57] ABSTRACT

A coupler for removably coupling a tool attachment at an end of a supporting arm of a powered digging or material-moving machine. The coupler includes a latch which permits quick interchanging of tool attachments on the arm. One embodiment provides a means for remotely disengaging the latch so that a machine operator may interchange tool attachments without having to dismount the machine to manually assist interchanging of attachments.

9 Claims, 10 Drawing Figures

QUICK-RELEASE COUPLER

FIELD OF THE INVENTION

This invention relates to a coupler for removably coupling a tool attachment at an end of a supporting arm.

BACKGROUND OF THE INVENTION

A variety of tool attachments have been provided for use with powered digging or material-moving apparatus such as excavators, front end loaders, backhoes, bulldozers and the like. Such apparatus typically includes one or more supporting arms at the end of which a tool attachment may be pivotally connected.

One tool attachment frequently used with such apparatus is the so-called "bucket" used in many digging and material-moving applications. A wide variety of sizes and shapes of buckets have been provided for various applications. For example, the so-called "digging" bucket is a relatively heavy duty bucket used for moving material such as blasted rock, heavy gravel, or compacted earth. "Digging" buckets may be supplied in varying widths. The so-called "clean-up" bucket typically comprises a relatively wide bucket used primarily for carrying material from one location to another as, for example, loading earth onto a truck. Another attachment is the so-called "V" bucket (also known as a "ditching" bucket) used in forming a V-shaped ditch. Other common tool attachments include "rakes" (used for clearing brush and the like), "clamshells" (also known as "grab-buckets", essentially comprising two buckets hinged together to form an inverted scoop which may be lowered in the open position onto a pile of material and then closed over the material to entrap some material for movement to another location) and the so-called "ripper" (usually comprising a tooth-shaped member and used to break up hard material which may then be moved with one of the bucket-type attachments).

During operation of such apparatus, the operator may find it desirable to interchange tool attachments to perform different tasks. For example, an operator moving loose material with a bucket-type attachment may encounter hard material which requires breaking up into relatively small pieces before it may be moved with the bucket. In such a case, the operator may wish to replace the bucket with a "ripper", use the "ripper" to break up the hard material, then replace the "ripper" with the bucket and continue moving the broken material.

The mechanism typically provided for use with such apparatus to secure a tool attachment to the end of an arm often includes one or more pins which are inserted in apertures located near the end of the arm and in co-operating apertures in a hook-up mechanism fastened to each tool attachment desired to be used with the apparatus. Fastening members are also usually provided to prevent the pins from working free after they have been inserted. To remove a tool attachment which has been affixed to the end of an arm, the operator must dismount the vehicle, manually remove the pin fastening members and drive the pins out of the arm apertures and co-operating apertures of the hook-up mechanism. To secure a different tool attachment to the arm, the operator must then remount the vehicle and position the arm to align the apertures in the arm with the co-operating apertures of the hook-up mechanism of the tool attachment which is to replace the removed attachment. The operator must then dismount the vehicle again, manually insert the pins in the aligned apertures and replace the pin fastening members before he can recommence operations.

Obviously, it is relatively time consuming for the operator to interchange tool attachments as described above. Powered digging and material-moving apparatus is typically very expensive to operate, and it is therefore desirable to maximize the time during which the apparatus is performing its intended function and to minimize the time taken for such non-productive tasks as interchanging tool attachments. A coupler would clearly be useful to assist the operator in interchanging tool attachments. With the typical mechanism described above, the operator must dismount the vehicle at least twice to manually remove and then replace the pins and fastening members. Of course, the operator would not have to dismount if a second man is available to assist him. However, a second man is not always available and, if one is, then his presence would probably necessitate further expense and time would still be required for him to manually remove or replace the pins and fastening members.

One improved coupling mechanism which has been provided comprises a link mechanism pivotally mounted at the end of the arm and a cooperating hook-up mechanism, rigidly affixed to each tool attachment of interest. To couple an attachment to the arm, the operator must position the arm and its attached link mechanism to engage the hook-up mechanism of a selected tool attachment. The operator must then dismount the vehicle to manually fasten the link mechanism and hoop-up mechanism together by inserting a wedge-type device into co-operating apertures in the link mechanism and hook-up mechanism, and then secure the wedge in place with one or more bolts to complete the coupling of the tool attachment to the arm. To remove the attachment, the operator must again dismount the vehicle and manually remove the bolts and the wedge before the arm may be manoeuvred free of the attachment for securing to a different attachment. Although this coupling mechanism provides some improvement in reducing the number of manual operations required to interchange attachments, it still requires a considerable amount of time and requires the vehicle operator to dismount the vehicle at least twice during the interchanging operation, unless a second man is available to assist him.

Use of such prior coupling mechanisms may prove frustrating to the operator, who may feel that it would take an unreasonable amount of time for him to dismount and remount the vehicle twice to perform the cumbersome task of manually unfastening and re-fastening such prior coupling mechanisms. This may encourage the operator to use a tool attachment to perform a function for which it was not primarily intended, which may damage the attachment, or result in decreased productivity during use of an attachment to perform a task for which it was not primarily intended. Furthermore, use of a tool attachment unsuited to the task at hand may prove dangerous.

Accordingly, it is an object of the present invention to provide a coupler which substantially reduces the number of manual operations required to interchange tool attachments on a supporting arm. A related object is to provide a coupler which permits rapid interchanging of tool attachments.

A further object is to provide a coupler which is simple in construction, uncomplicated in its operation and easy to use.

SUMMARY OF THE INVENTION

According to the invention there is provided a coupler for removably coupling a tool attachment at an end of a supporting arm. The coupler comprises a body member and first and second pivot pin means carried by the body member for pivotally supporting the body member at the end of the arm. The first pivot pin means is disposed at one end of the body member and extends transversely between opposed sides of the body member. The second pivot pin means is disposed intermediate the one end and a second end of the body member and extends between the opposed sides of the body member parallel to the first pivot pin. The coupler also comprises a latch means for removably latching the coupler to the tool attachment. The latch means includes a latch member pivotally supported by the body member by pivot pin means disposed towards the second end of the body member and extending between the opposed sides of the body member parallel to the first and second pivot pin means. The latch member is for latchingly engaging the tool attachment in an engaged position such that when the body member tends to pull away from the tool attachment, the latch member acts in tension to restrain such movement. The latch means also includes latch retention means for normally retaining the latch member in the engaged position. The latch retention means includes compression spring biasing means carried by the body member for biasing the latch member in the engaged position. The latch retention means is responsive to an applied force for disengaging the latch member from the engaged position, thereby permitting coupling and decoupling of the tool attachment from the supporting arm.

In a preferred embodiment, the latch means includes a latch plate, fixedly carried by the tool attachment. The latch plate includes an aperture for permitting latching engagement of the latch member with the latch plate.

Advantageously, the latch member includes an arcuate end surface which, as the tool attachment is coupled to the supporting arm, slidingly contacts the latch plate in such a manner that the latch plate forcibly pivots the latch member away from the engaged position until the aperture latchingly engages the latch member.

Preferably, the latch plate includes a first arcuate surface forming a portion of the boundary defining the aperture, which first arcuate surface latchingly engages the latch member when the tool attachment is coupled to the supporting arm. Advantageously, the latch plate includes a second arcuate surface such that the sliding contact between the arcuate end surface of the latch member and the latch plate occurs between the arcuate end surface of the latch member and the second arcuate surface of the latch plate.

Various means may be provided for disengaging the latch. For example, the coupler may include means carried by the latch member for receiving a lever arm by means of which lever arm an external force counteracting the biasing action of the spring means may be applied to the latch member for decoupling the tool attachment from the supporting arm. Alternatively, the coupler may include a hydraulic cylinder, pivotally connected between the latch member and the supporting arm by means of which hydraulic cylinder a hydraulic actuated force counteracting the biasing action of the spring means may be applied to the latch member for decoupling the tool attachment from the supporting arm.

The latch means may include a pair of parallel opposed support members carried by the tool attachment, each of the support members including a first and second socket for slidingly receiving the first and second pivot pins, the latch plate extending transversely between the support members and parallel to the pivot pins.

Advantageously, the latch member is centrally disposed between the opposed sides of the body member.

DRAWINGS

An embodiment of the invention will now be described in more detail with reference to the drawings, in which.

DETAILED DESCRIPTION OF AN EMBODIMENT OF THE INVENTION

Figure 1:
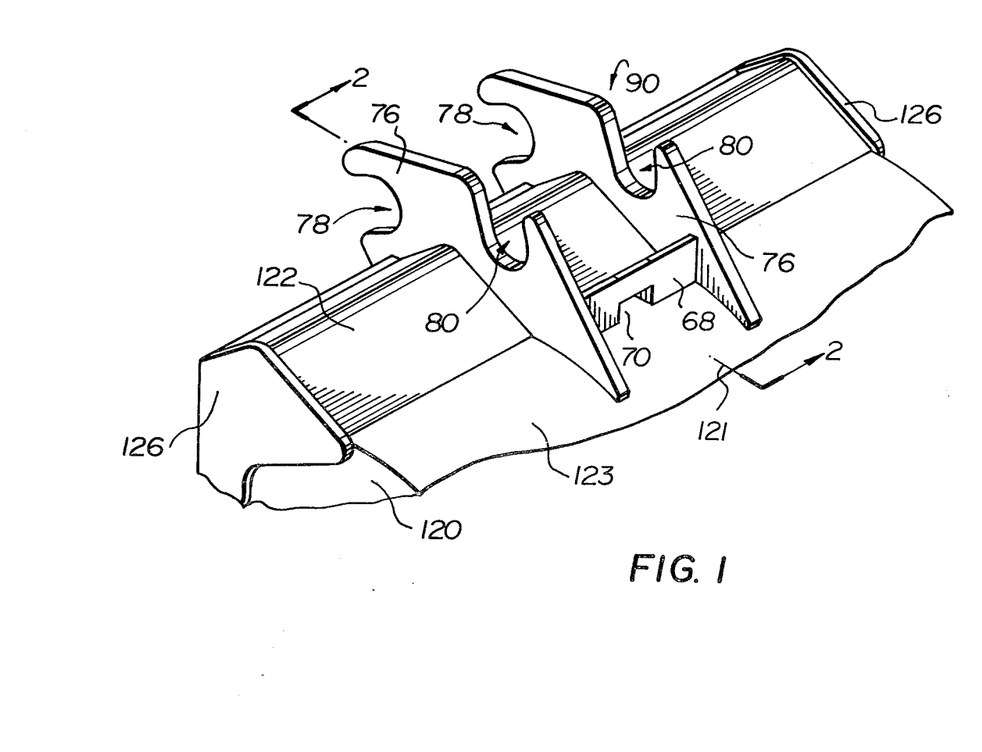
FIG. 1 is a perspective rear view of a portion of a tool attachment to which is affixed a coupler hook-up.
Figure 6:
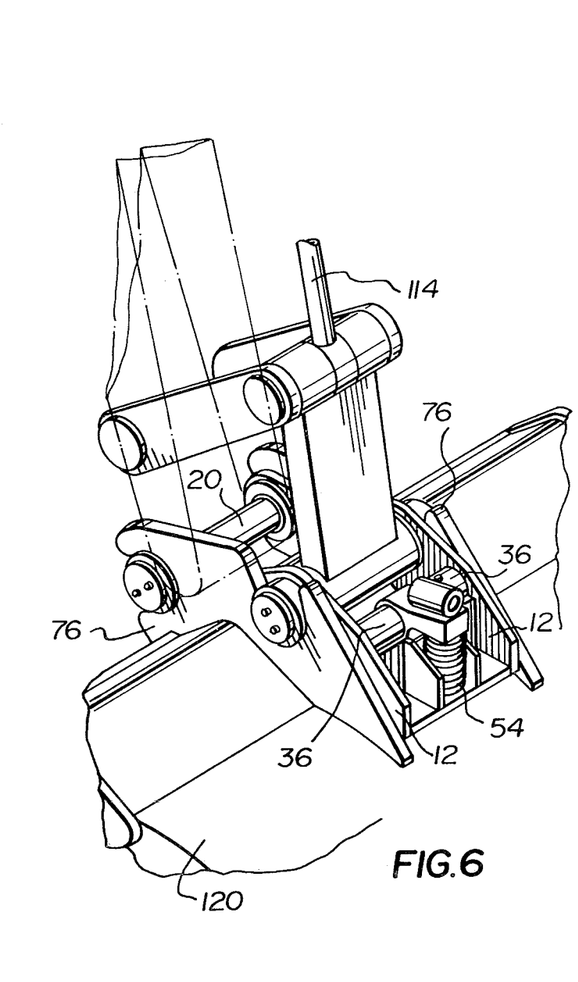
FIG. 6 is a perspective view showing the coupler of FIG. 5 engaged with the hook-up of FIG. 1.
Figure 7:
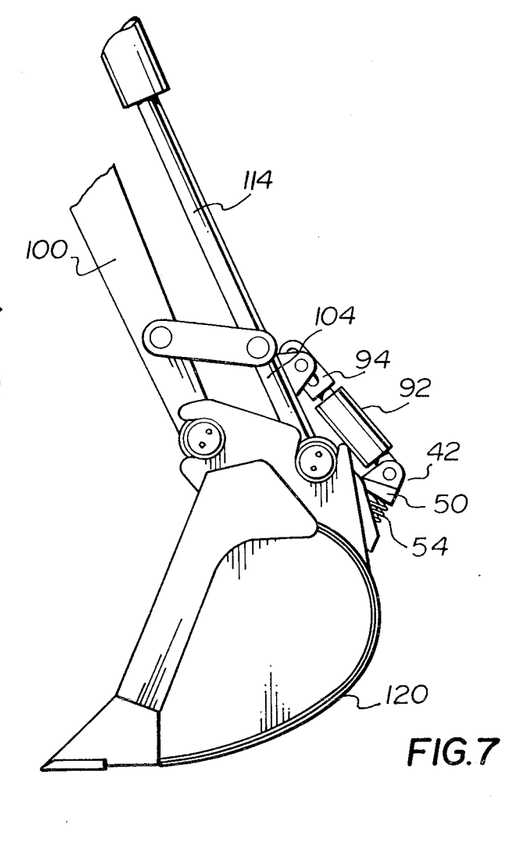
FIG. 7 is a perspective view of an alternate embodiment of the coupler shown in FIG. 6.
Figure 8:
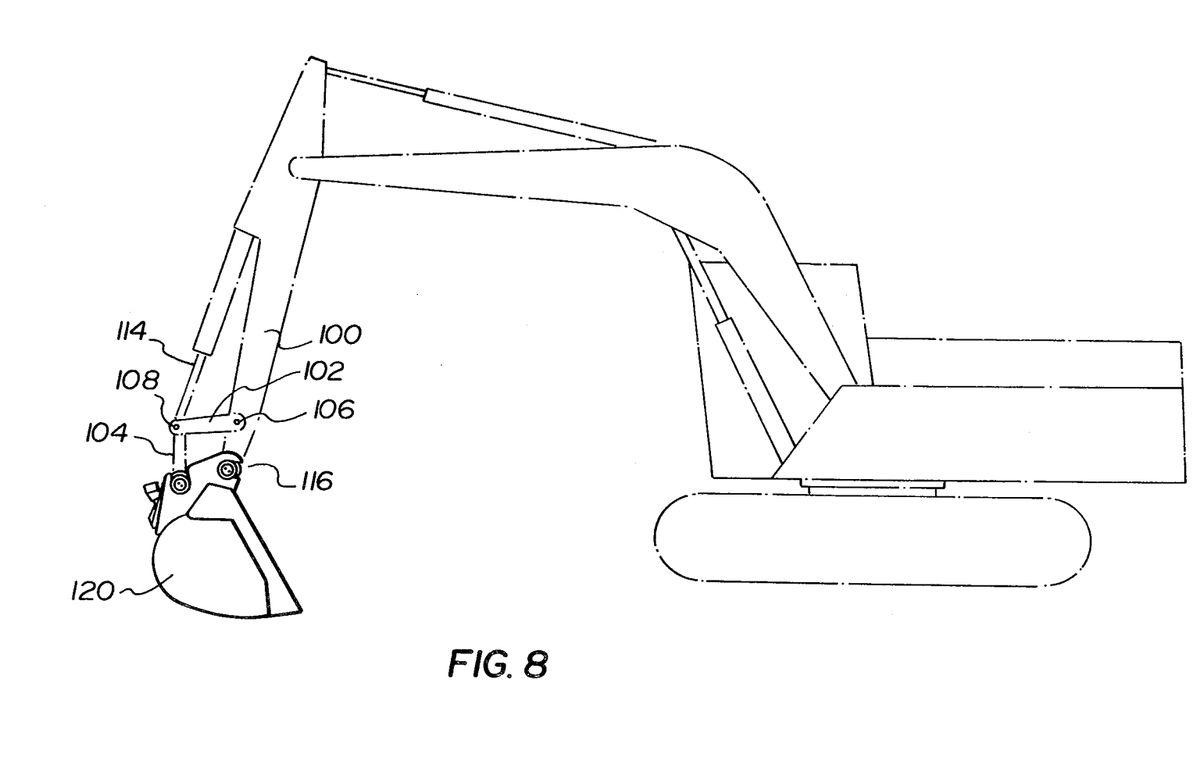
FIG. 8 is a side elevation view of an excavator-type apparatus having an arm on which is mounted a coupler which removably couples a bucket-type attachment to the arm.

For general purposes of illustration, FIG. 8 shows an excavator-type apparatus having an arm 100 on which is mounted a coupler which removably couples a bucket-type tool attachment 120 to the arm. However, it will not be necessary to describe the invention with reference to a particular tool attachment, or with reference to a particular digging or material-moving apparatus. FIGS. 1, 6 and 7 show a portion of an arbitrary tool attachment 120 which might, for example, be a rear portion of an excavator bucket-type attachment. A side elevation view of such an attachment may be seen in FIGS. 9A and 9B.

Figure 5:
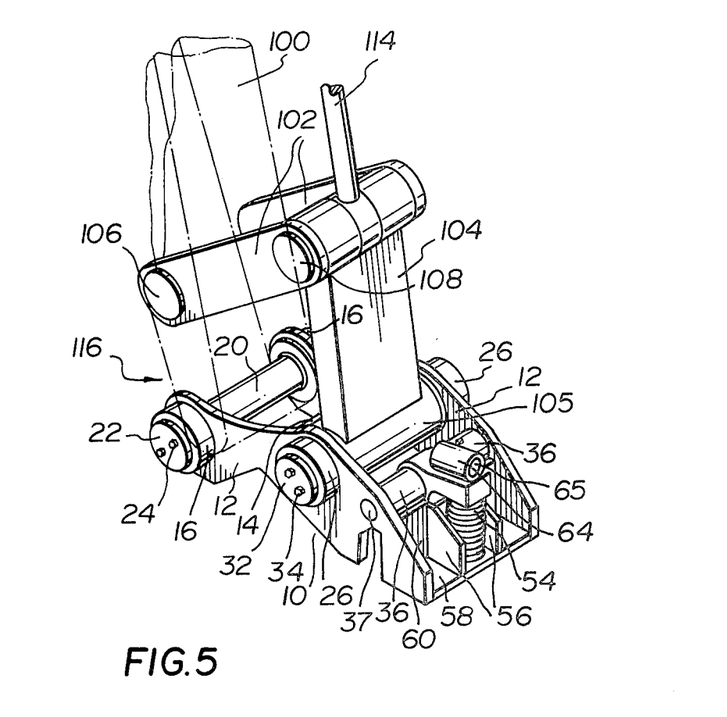
FIG. 5 is a perspective view showing the coupler of FIG. 3 mounted on an arm. The arm is shown in broken lines.

A pivotal connection means is commonly provided for direct pivotal connection of the arm of a powered digging or material-moving apparatus to a tool attachment. The coupler of the present invention may be used in conjunction with such common pivotal connection means. FIGS. 5 and 8 show in part a common pivotal connection means for an excavator-type apparatus, which includes a pair of link arms 102, and a link member 104. Link arms 102 are pivotally connected to arm 100 at 106. Link arms 102 are further pivotally connected to link member 104 at 108. Motor means 114

(which is typically a double-acting hydraulic cylinder) is pivotally connected at one end to arm 100 at a point further from end 116 of arm 100 than pivotal connection 106. The other end of motor means 114 is pivotally connected to link member 104.

A cylindrical aperture through arm 100 (not shown) is provided nearer to end 116 than pivotal connection 106. Tool attachments for direct coupling to such common pivotal connection means often provide two pairs of apertured plates rigidly affixed to the attachment. The apertures in each pair of plates are axially aligned. To secure arm 100 to such an attachment, the cylindrical aperture of arm 100 is axially aligned between one pari of plate apertures and a pin inserted within the aligned apertures and fastened in position. Cylindrically apertured sleeve 105 at the free end of link member 104 is axially aligned between the other pair of plate apertures and another pin inserted within the aligned apertures and fastened in position. To remove the attachment from the arm, the fastening members must be removed from the pins and the pins driven out of the aligned apertures.

Figure 3:
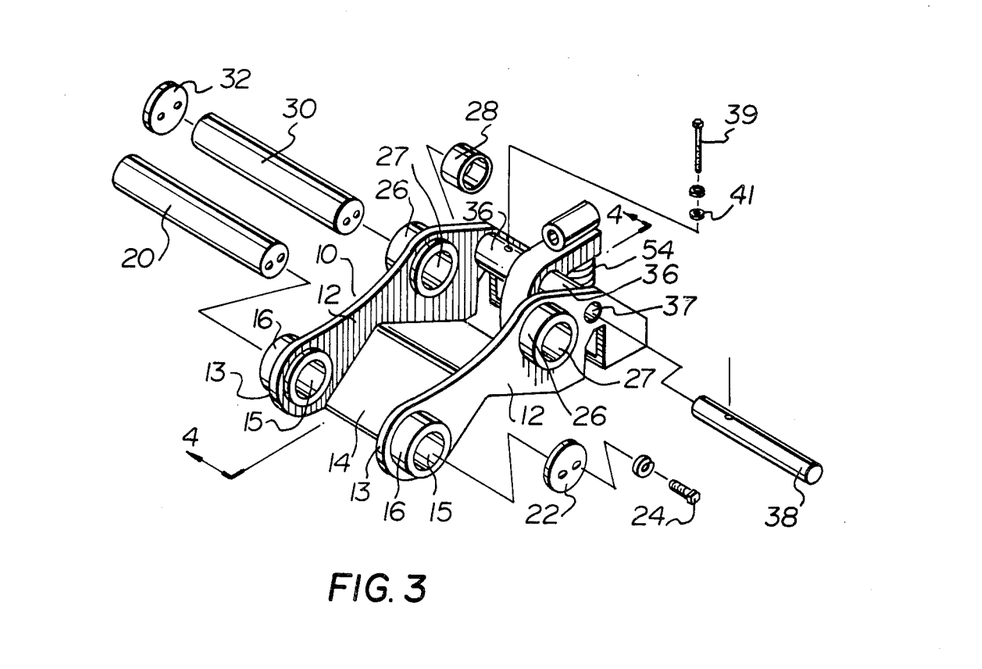
FIG. 3 is a partially exploded perspective view of a coupler.
Figure 4:
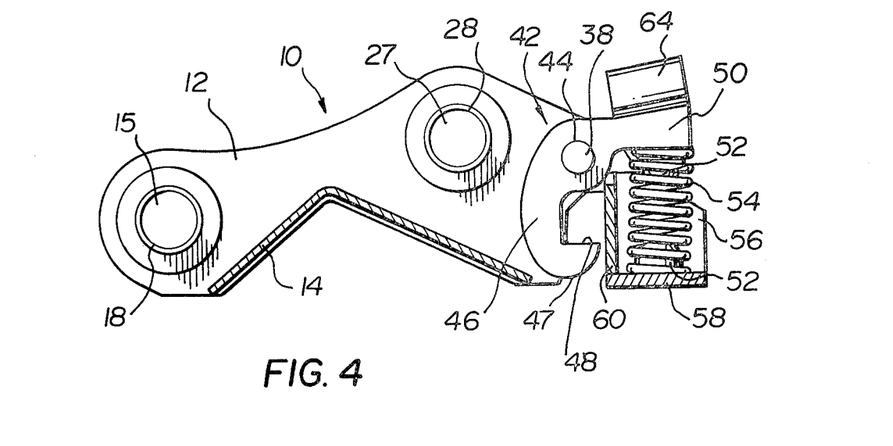
FIG. 4 is a sectional view taken along line 4—4 of FIG. 3.

A coupler generally designated 10 is shown in FIGS. 3 and 5. The coupler comprises a body member which includes a pair of coupler plates 12 rigidly fixed in spaced, generally parallel relation by spacer plate 14. Axially aligned circular apertures 15 (FIG. 3) are located near ends 13 of coupler plates 12. Main pivot bosses 16, having cylindrical apertures axially aligned with circular apertures 15 are rigidly affixed to the outer surfaces of coupler plates 12. Replaceable wear bushings 18 (FIG. 4) may be press-fitted into the cylindrical apertures of main pivot bosses 16.

As best seen in FIG. 5, end 116 of arm 100 is positioned between coupler plates 12 to align the cylindrical apertures of main pivot bosses 16 axially with the cylindrical aperture of arm 100. As shown in FIG. 3, main pivot pin 20 is inserted within the aligned apertures. Retainer plates 22 (only one of which is shown in FIG. 3) are fastened to both ends of main pivot pin 20 with bolts 24, to prevent main pivot pin 20 becoming dislodged.

Cylindrically apertured pivot link bosses 26 are rigidly affixed to both sides of coupler plates 12, in axial alignment with circular apertures 27 which are also in axial alignment. Replaceable wear bushings 28 may be press-fitted into the cylindrical apertures of pivot link bosses 26.

After main pivot pin 20 is inserted as described above, coupler 10 may be rotated anticlockwise (as viewed in FIG. 4) about main pivot pin 20, and link member 104 may be simultaneously rotated about pivotal connection 108, to axially align cylindrically apertured sleeve 105 between the cylindrical apertures of pivot link bosses 26. Pivot link pin 30 is then inserted within the aligned apertures to form a pivotal connection as seen in FIG. 5. Retainer plates 32 are affixed to both ends of pivot link pin 30 with bolts 34, to prevent pivot link pin 30 becoming dislodged. Main pivot pin 20 and pivot link pin 30 thus pivotally support the coupler body member at the end of the arm.

Cylindrically apertured latch pin bosses 36 are rigidly affixed between coupler plates 12 in axial alignment with circular apertures 37 which are also axially aligned.

A latch, generally designated 42 (see FIG. 4), having a shank 46, a lever arm 50, a cylindrical aperture 44, and a latching face 48 is provided. Sleeve 64, having cylindrical aperture 65 (FIG. 5) is rigidly affixed to latch lever arm 50. Latch 42 is positioned (as best seen in FIGS. 3 and 5) between latch pin bosses 36 to align aperture 44 axially with the cylindrical apertures of latch pin bosses 36. Latch pivot pin 38 is inserted within the aligned apertures to pivotally support latch 42 on the coupler body member approximately equidistant between coupler plates 12. As shown in FIG. 3, co-operating apertures are provided through one of latch pin bosses 36 and through latch pin 38, generally transverse to the longitudinal axis of latch pin 38. The apertures are axially aligned, bolt 39 inserted therein, and nut 41 fastened to the protruding end of bolt 39 to prevent latch pin 38 becoming dislodged.

As best seen in FIG. 5, backing plate 60 is rigidly fixed between coupler plates 12 in generally vertical position. Spring base plate 58 is rigidly fixed between coupler plates 12 generally perpendicular to backing plate 60. Spring-box gussets 56 are rigidly fixed in spaced, generally parallel relation between coupler plates 12 and generally perpendicular to backing plate 60 and to spring base plate 58. A pair of opposed spring retainers 52 (FIG. 4) are provided, one of which is rigidly fixed to latch lever arm 50, and the other of which is rigidly fixed to spring-base plate 58, between spring-box gussets 56. Spring 54 is longitudinally compressed and respective coiled ends thereof placed over spring retainers 52 to align spring 54 generally axially with spring retainers 52. The expansive force of spring 54 will tend to rotate latch 42 about latch pivot pin 38 anticlockwise (as viewed in FIG. 4) thus normally retaining the latch in the engaged position. A cover plate (not shown) may be removably affixed between spring box gussets 56 to substantially enclose spring 54. Besides assisting in protecting spring 54 against direct physical damage during digging or material-moving operations, such a cover plate may prevent material such as mud or stones lodging between adjacent coils of the spring, thus interfering with compression of the spring when it is desired to open the latch as hereinafter described.

A means for pivotally supporting the coupler, or "coupler hook-up" generally designated 90 (FIG. 1) is rigidly affixed to each tool attachment desired to be used with coupler 10.

A pair of support members or hook-up ears 76 are rigidly affixed to the rear of tool attachment 120 in spaced, parallel relation, and approximately equidistant on opposite sides of transverse axis 121 of tool attachment 120.

Each hook-up ear 76 has a main pivot socket 78, and a pivot link socket 80. Hook-up ears 76 are affixed to tool attachment 120 with main pivot sockets 78 in axial alignment, and with pivot link sockets 80 in axial alignment.

Latch plate 68 extends transversely between hook-up ears 76, and is rigidly fixed to tool attachment 120 and to hook-up ears 76. Latching aperture 70 projects through latch plate 68 at a point approximately equidistant between hook-up ears 76.

Figure 2:
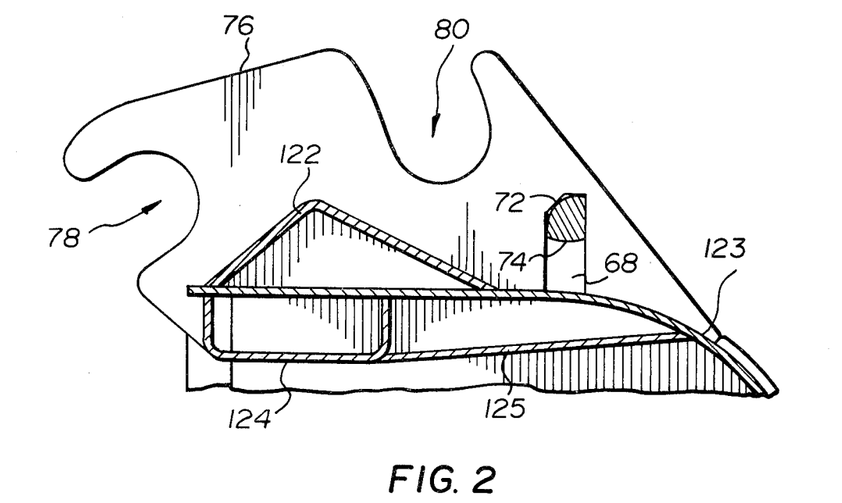
FIG. 2 is a sectional view taken along line 2—2 of FIG. 1.

Tool attachments commonly provide various stiffening members to increase their structural rigidity in the vicinity of the hook-up. To adapt an existing tool attachment having a prior type of hook-up for use with the coupler of the invention, it will likely be necessary to remove the prior hook-up for replacement with a hook-up similar to hook-up 90. In some cases it may also be necessary to remove existing stiffening members from the tool attachment since they may have contours which would interfere with the pivotal connection of the coupler to the hook-up. FIGS. 1 and 2 show one way of providing stiffening members on the tool attachment which will cooperate with coupler 10 and hook-up 90. Top stiffener 122 is rigidly fixed to bucket shell 123 width-wise of the bucket and between side-cutters 126. As best seen with reference to FIGS. 2 and 4; top stiffener 122 may be contoured to conform to the shape of coupler plates 12 and spacer plate 14. When coupler 10 engages hook-up 90 (as hereinafter described), coupler plates 12 will contact top stiffener 122, but there will be no contact between spacer plate 14 and top stiffener 122. Channel stiffener 124 is rigidly fixed inside bucket shell 123 (FIG. 2) width-wise of the bucket. Support brace 125, which also extends width-wise of the bucket, is rigidly fixed between channel stiffener 124 and bucket shell 123. Channel stiffener 124 and support brace 125 lend increased structural rigidity to bucket shell 123 in the vicinity of hook-up 90. Although the presence of channel stiffener 124 and support brace 125 inside bucket shell 123 will decrease the volume of the bucket somewhat, this is not thought to be significant.

To engage coupler 10 with hook-up 90, thus removably coupling tool attachment 120 to arm 100, the operator first actuates motor means 114 to pivot coupler 10 anticlockwise about main pivot pin 20 (as viewed in FIG. 5) and to raise pivot link bosses 26 above the hook-up ears of a selected tool attachment. The operator then manoeuvres arm 100 in the direction of the arrow shown in FIG. 9A to slidingly insert main pivot bosses 16 within main pivot sockets 78. The operator then actuates motor means 114 to pivot coupler 10 in the direction of the arrow shown in FIG. 9B until pivot link bosses 26 are slidingly received within pivot link sockets 80, thus engaging the coupler as seen in FIG. 6.

Figure 9A:
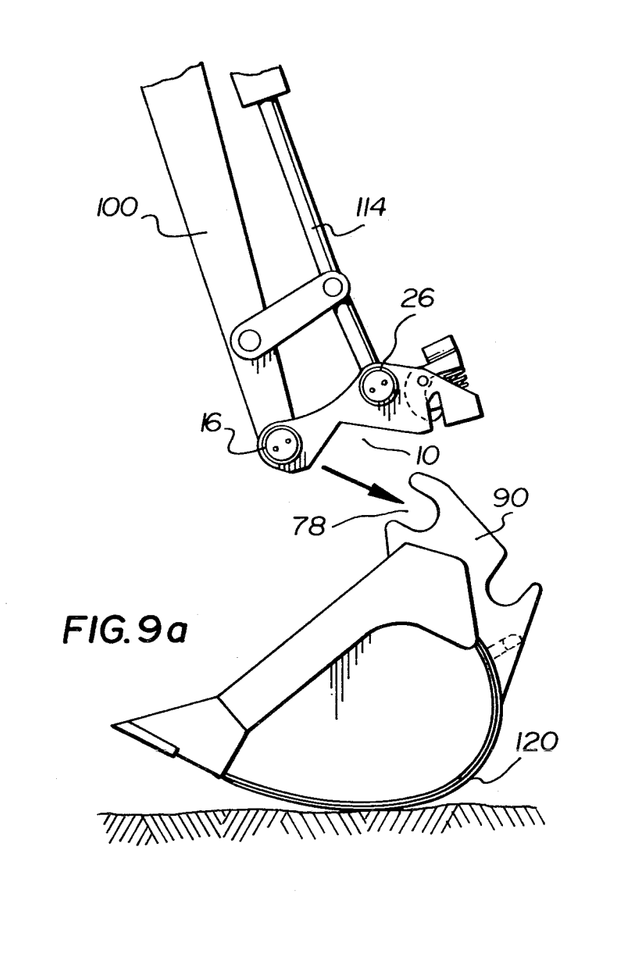
FIGS. 9A and 9B are side elevation views showing the sequence of steps required to engage the coupler of FIG. 3 with the coupler hook-up of FIG. 1.
Figure 9B:
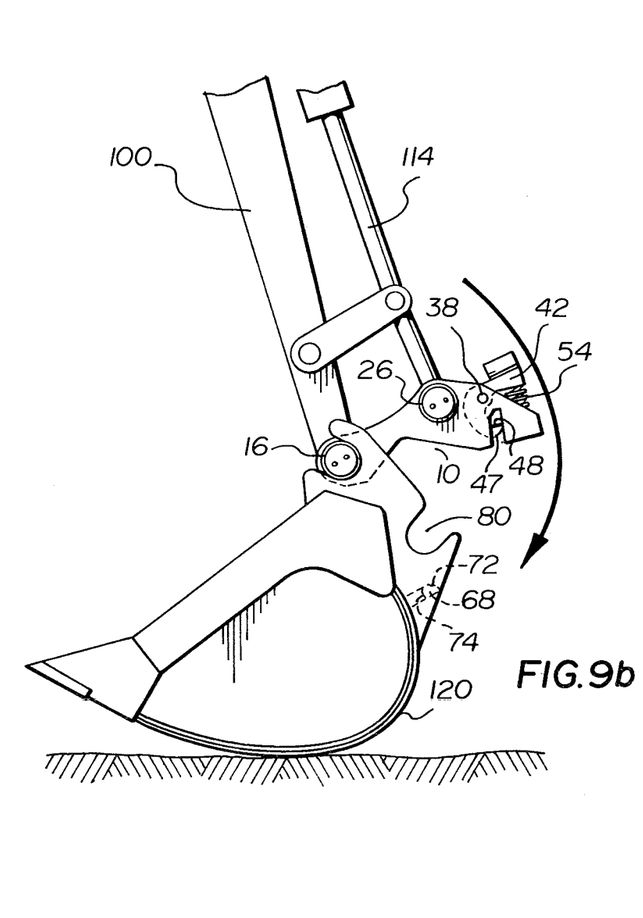

At some point during the pivoting of coupler 10 in the direction of the arrow shown in FIG. 9B, arcuate surface 47 of latch 42 slidingly contacts second arcuate surface 72 of latch plate 68. As coupler 10 continues to pivot in the direction of the arrow shown in FIG. 9B, latch 42 will tend to rotate clockwise about latch pivot pin 38 until the plane of latching face 48 is carried below first arcuate surface 74 of latch plate 68, at which point the expansive force of spring 54 will cause latch 42 to pivot anticlockwise about latch pivot pin 38 thus inserting latching face 48 under first arcuate surface 74 of latch plate 68 and engaging the latch.

Preferably, latching surface 48 engages firmly against first arcuate surface 74. Such firm engagment assists in holding tool attachment 120 relatively rigidly with respect to arm 100 while the latch is engaged. First arcuate surface 74 assists in attaining such firm engagement. If first arcuate surface 74 was made flat, then there would be a gap between latching surface 48 and such flat surface after the latch was engaged, because allowance would have to be made for the rotation of latch 42 about latch pivot pin 38. First arcuate surface 74 allows the leading edge of latching surface 48 to be inserted into latching aperture 70 with a minimal clearance between the two surfaces.

With latch 42 engaged as described above, the operator may commence digging or material-moving operations. Note that the operation of coupling tool attachment 120 to arm 100 is quite simple. The operator need not dismount the vehicle to manually assist the coupling operation. The coupling operation can be performed quickly. It has been found that a skilled operator can easily align main pivot bosses 16 within main pivot sockets 78 as shown in FIG. 9A. Thereafter, the operator need only actuate motor means 114 in some well known fashion to complete the coupling operation, removably coupling tool attachment 120 to arm 100.

To decouple tool attachment 120 from arm 100, latch 42 must be opened to allow the attachment to be freed from the arm. In the embodiment illustrated in FIGS. 1 through 6, 8 9A and 9B, the operator would manoeuvre arm 100 to position tool attachment 120 clear of the ground. Preferably, the operator would position tool attachment 120 such that its centre of gravity is slightly to the left of and below main pivot bosses 16 (as viewed in FIG. 9B) thus removing from the latch a substantial portion of the force caused by the weight of tool attachment 120. The operator would then dismount the vehicle, insert a disengaging bar (not shown) in cylindrical aperture 65 of sleeve 64 and then manually press down on the disengaging bar to compress spring 54 and pivot latch 42 clockwise about latch pivot pin 38 (as viewed in FIG. 4), until latch 42 is drawn completely out of latching aperture 70, at which point the weight of tool attachment 120 causes it to rotate clockwise about main pivot pin 20 (as viewed in FIG. 6) so that latch 42 is held away from latching aperture 70. The operator may then remount the vehicle to manoeuvre arm 100 to draw it free of tool attachment 120.

In an alternative embodiment illustrated in FIG. 7, there is provided disengaging motor means 92 (which may, for example, be a hydraulic cylinder), which has one end affixed to slotted member 94 which is slidingly mounted on link member 104. The opposite end of disengaging motor means 92 is pivotally mounted on latch lever arm 50. During digging or material-moving operations, as motor means 114 is actuated to pivot tool attachment 120 on arm 100, slotted member 94 and disengaging motor means 92 may slide freely with reference to link member 104. When it is desired to decouple tool attachment 120 from arm 100, the operator would again position tool attachment 120 clear of the ground, and then actuate disengaging motor means 92 in some well-known manner to slide slotted member 94 generally upward and to the left as viewed in FIG. 7 to the maximum extent permitted by the length of the slot, following which disengaging motor means 92 exerts a force between link member 104 and latch-lever arm 50 to compress spring 54, causing latch 42 to pivot about latch pivot pin 38 and decoupling the attachment as described above.

We claim:

1. A coupler for removably coupling a tool attachment at an end of a supporting arm, said coupler comprising:
  (a) a body member;
  (b) first and second pivot pin means carried by said body member for pivotally supporting said body member at said end of said arm, said first pivot pin means being disposed at one end of said body member and extending transversely between opposed sides of said body member, said second pivot pin means being disposed intermediate said one end and a second end of said body member and extending between said opposed sides of said body member parallel to said first pivot pin; and,
  (c) latch means for removably latching said coupler to said tool attachment, said latch means including:
    (i) a latch member pivotally supported by said body member by pivot pin means disposed towards said second end of said body member and extending between said opposed sides of said body member parallel to said first and second pivot pin means, said latch member for latchingly engaging said tool attachment in an engaged position such that when said body member tends to pull away from said tool attachment the latch member acts in tension to restrain such movement; and, (ii) latch retention means for normally retaining said latch member in the engaged position, said latch retention means including compression spring biasing means carried by said body member for biasing said latch member in the engaged position and being responsive to an applied force for disengaging said latch member from said engaged position thereby permitting coupling and decoupling of said tool attachment from said supporting arm.

2. A coupler as defined in claim 1, wherein said latch means includes a latch plate fixedly carried by said tool attachment, said latch plate including an aperture for permitting latching engagement of said latch member with said latch plate.

3. A coupler as defined in claim 2, wherein said latch member includes an arcuate end surface which, as said tool attachment is coupled to said supporting arm, slidingly contacts said latch plate in such manner that the latch plate forcibly pivots the latch member away from said engaged position until said aperture latchingly engages said latch member.

4. A coupler as defined in claim 3, wherein said latch plate includes a first arcuate surface forming a portion of the boundary defining said aperture, which first arcuate surface latchingly engages said latch member when said tool attachment is coupled to said supporting arm.

5. A coupler as defined in claim 4, wherein said latch plate includes a second arcuate surface, and wherein said sliding contact between the arcuate end surface of said latch member and said latch plate occurs between said arcuate end surface and said second arcuate surface.

6. A coupler as defined in claim 1, which includes means carried by said latch member for receiving a lever arm by means of which lever arm an external force counteracting the biasing action of said spring means may be applied to said latch member for decoupling said tool attachment from said supporting arm.

7. A coupler as defined in claim 1, which includes a hydraulic cylinder pivotally connected between said latch member and said supporting arm by means of which hydraulic cylinder a hydraulic actuated force counteracting the biasing action of said spring means may be applied to said latch member for decoupling said tool attachment from said supporting arm.

8. A coupler as defined in claim 2, wherein
said latch means includes a pair of parallel opposed support members carried by said tool attachment, each of said support members including a first and second socket for slidingly receiving said first and second pivot pins, said latch plate extending transversely between said support members and parallel to said pivot pins.

9. A coupler as defined in claim 1, wherein said latch member is centrally disposed between said opposed sides of said body member.

* * * * *